(12) United States Patent
Berman et al.

(10) Patent No.: US 7,603,038 B1
(45) Date of Patent: Oct. 13, 2009

(54) SYSTEM AND METHOD THAT SUPPRESSES INTENSITY FLUCTUATIONS FOR FREE SPACE HIGH-SPEED OPTICAL COMMUNICATION

(75) Inventors: Gennady P. Berman, Los Alamos, NM (US); Alan R. Bishop, Los Alamos, NM (US); Dinh C. Nguyen, Los Alamos, NM (US); Boris M. Chernobrod, Santa Fe, NM (US); Vacheslav N. Gorshkov, Kiev (UA)

(73) Assignee: Los Alamos National Security, LLC, Los Alamos, NM (US)

( * ) Notice: Subject to any disclaimer, the term of this patent is extended or adjusted under 35 U.S.C. 154(b) by 500 days.

(21) Appl. No.: 11/516,136

(22) Filed: Sep. 5, 2006

(51) Int. Cl.
*H04B 10/00* (2006.01)
(52) U.S. Cl. .................. 398/119; 398/118; 398/128; 398/130
(58) Field of Classification Search ............ 398/118, 398/119, 121, 124, 125, 127, 128, 130, 135, 398/136, 138, 123, 137
See application file for complete search history.

(56) References Cited

U.S. PATENT DOCUMENTS

| | | | | |
|---|---|---|---|---|
| 4,054,794 A | * | 10/1977 | Laughlin et al. | ............ 398/130 |
| 6,501,578 B1 | * | 12/2002 | Bernstein et al. | ............ 398/201 |
| 7,266,257 B1 | * | 9/2007 | Chowdhury et al. | ............ 385/1 |
| 2005/0196170 A1 | * | 9/2005 | Winsor | ................... 398/118 |
| 2006/0233554 A1 | * | 10/2006 | Ramachandran et al. | .... 398/141 |

OTHER PUBLICATIONS

Pan et al., "Free-Space Optical Communications: Opportunities and Challenges, a Carrier's Perspective," Proc. SPIE, vol. 4911, Oct. 2002, pp. 58-72.
Belen'kii et al., "Free-Space Laser Communication Model," Proc. SPIE, vol. 5595, Oct. 2004, pp. 167-184.
Ricklin et al, "Atmospheric Optical Communication with a Gaussian Schell Beam," J. Opt. Soc. Am. A. vol. 20, No. 5, May 2003, pp. 856-866.
Korotkova et al, "Model for a Partially Coherent Gaussian Beam in Atmospheric Turbulence with Application in Lasercom," Opt. Eng., vol. 43, No. 2, Feb. 2004, pp. 330-341.

(Continued)

*Primary Examiner*—M. R. Sedighian
(74) *Attorney, Agent, or Firm*—Samuel L. Borkowsky

(57) ABSTRACT

A high-speed (Gbps), free space optical communication system is based on spectral encoding of radiation from a wide band light source, such as a laser. By using partially coherent laser beams in combination with a relatively slow photosensor, scintillations can be suppressed by orders of magnitude for distances of more than 10 km. To suppress the intensity fluctuations due to atmospheric turbulence, a source with partial transverse coherence in combination with slow response time photodetector is used. Information is encoded in the spectral domain of a wideband optical source by modulation of spectral amplitudes. A non-coherent light source with wide spectrum (an LED, for example) may be used for high-speed communication over short (less than about a mile) distances.

7 Claims, 2 Drawing Sheets

OTHER PUBLICATIONS

Voelz et al, "Pseudo-Partially Coherent Beam for Free-Space Laser Communication," Proc. SPIE, vol. 5550, Aug. 2004, pp. 218-224.

Ahearn et al, "Multiple Quantum Well (MQW) Spatial Light Modulators (SLM) for Optical Data Processing and Beam Steering," Proc. SPIE, vol. 4457, Aug. 2001, pp. 43-53.

Adam et al., "Experimental Optical CDMA System Based on Spectral Amplitude Encoding of Noncoherent Broadband Sources," Proc. SPIE, vol. 2614, Oct. 1995, pp. 122-132.

Yakushkin, "Strong Intensity Fluctuations in the Field of a Light Beam in a Turbulent Atmosphere," Radiophys Quantum Electron, vol. 19, No. 3, Mar. 1976, pp. 270-276.

Fante, "Electromagnetic Beam Propagation in Turbulent Media," Proc. of IEEE, vol. 63, No. 12, Dec. 1975, pp. 1669-1692.

Berman et al., "Photon Distribution Function for Long-Distance Propagation of Partially Coherent Beams Through the Turbulent Atmosphere," Physical Review A, vol. 74, 2006, pp. 13805-13811.

* cited by examiner

SYSTEM AND METHOD THAT SUPPRESSES INTENSITY FLUCTUATIONS FOR FREE SPACE HIGH-SPEED OPTICAL COMMUNICATION

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to optical communication and more particularly to a high data rate (Gigabit per second, Gbps), free space optical communication system and method that suppresses intensity fluctuations due to atmospheric turbulence.

BACKGROUND OF THE INVENTION

The development of a high data rate, free space optical communication (FSOC) system has some limitations related to atmospheric turbulence. Laser beams experience three major effects under turbulence. First, the beam phase front is distorted by fluctuations in the refractive index, which causes intensity fluctuations that are known in the art as scintillations. The scintillations are the most severe problem and result in a significant increase of the bit error rate (BER) and degradation of laser communication system performance. Second, eddies having a size greater than the beam diameter randomly deflect the laser beam as a whole. This phenomenon is called "wandering". Third, propagating a laser beam through a turbulent atmosphere causes the laser beam to spread more than what is predicted by diffraction theory. For example, a gigabit data rate communication channel can operate with BER of $10^{-9}$ over a distance not more than about 2.5 kilometers (km), even for clear weather. New approaches are needed to overcome this limitation.

Several approaches have been developed to mitigate the effects of turbulence on laser communication system performance. Some of these approaches are concerned with aperture averaging, phase diffusers, adaptive optics, and special data communication encoding (for a review, see: Andrews et al. in "Laser Beam Scintillation with Applications, SPIE Press, Bellingham, Wash., USA, 2001). None of these approaches eliminates the negative influence of turbulence on laser communication completely. New approaches are needed to avoid the negative influence of the atmospheric turbulence.

Recently, a technique of scintillation reduction based on the utilization of partially coherent beams (i.e., beams with multiple coherent spots in their transverse section) was demonstrated. Combining partially coherent beams with a time-averaging photodetector leads to a significant scintillation reduction with the corresponding improvement of the BER by several orders of magnitude. This phenomenon, however, cannot be utilized for a conventional encoding scheme in which the information is encoded in the form of a series of pulses. The main limitation of this technique is related to the requirement that the correlation time between different spatially coherent spots be shorter than the response time of the photodetector. This means that the spatial light modulator (SLM) must have an operating frequency $v$ higher than the bandwidth of the photodetector, corresponding to its inverse response time $v \gg T^{-1}$. Since the photodetector bandwidth must be higher than the data rate of the communication channel $v_{COM}$, $T^{-1} \gg v_{COM}$, the highest data rate is limited by the highest frequency of the SLM $v \gg v_{COM}$. To date, the highest frequency SLMs based on multiple quantum wells (MQW) can only operate at frequencies up to tens of MHz.

In the case of a non-coherent, wideband source such as a light emitting diode (LED), the coherence time could be shorter than the time response of a photodetector. It appears, however, that an LED has not been used for gigabit rate communication because of its limited modulation rate of less than a few hundred megahertz (MHz).

There remains a need for a high data rate, free space optical communication system that suppresses the negative influence of atmospheric turbulence.

SUMMARY OF THE INVENTION

In accordance with the purposes of the present invention, as embodied and broadly described herein, the present invention includes a system for free space, high-speed optical communication. The system includes (i) a transmitter portion comprising a wide band, pulsed light source that emits light beam pulses, a first spectral element for spatially dispersing the light beam pulses, a first electro-optical spatial light modulator for encoding the spectral domain of the light beam pulses from the pulsed beam of light, a second spectral element for recombining the dispersed, encoded light into single optical beam pulses, and a second electro-optical spatial light modulator for modifying the transverse coherence of the collected and encoded light beam pulses, (ii) a receiver portion comprising a third spectral element for dispersing the encoded and modified pulsed light beam pulses, and a photosensor array for detecting the dispersed, encoded, modified light beam pulses, and a data processing element for decoding and processing data received from the photodetector at a rate 'R' wherein $R \geq 1$ Gibabits per second (Gbps), and (iii) a feedback element in communication with said second spatial light modulator and said photodetector for maintaining an optimal value of a coherence radius, $r_c$, of the light beam pulses.

The invention also includes a method for suppressing fluctuations due to atmospheric turbulence for gigabyte data rate optical communication. The method involves spectrally dispersing wide band pulses of light from a pulsed light source, encoding the spectrally dispersed wide band pulses of light, collecting the spectrally dispersed, encoded wide band pulses of light, and thereafter modifying the transverse coherence of the collected and encoded wide band pulses of light, allowing the modified wide band pulses of light to travel a chosen distance, and receiving the wide band pulses of light after they have traveled the chosen distance while maintaining an optimal value of a coherence radius, $r_c$, of the wide band pulses of light.

The invention also includes a method for gigabyte data rate optical communication over a distance of less than about one mile using light emitting diodes (LED). The method involves spectrally dispersing wide band pulses of light from a light emitting diode light source, encoding the spectrally dispersed wide band pulses of light, recombining of the spectrally dispersed, encoded wide band pulses of light into a single optical beam, and thereafter allowing the wide band pulses of light to travel a distance "L" wherein $L \leq 1$ mile, and thereafter receiving the wide band pulses of light after they have traveling the distance "L".

BRIEF DESCRIPTION OF THE DRAWINGS

The accompanying drawings, which are incorporated in and form a part of the specification, illustrate embodiment(s)

of the present invention and, together with the description, serve to explain the principles of the invention. In the drawings.

DETAILED DESCRIPTION

Figure 1:
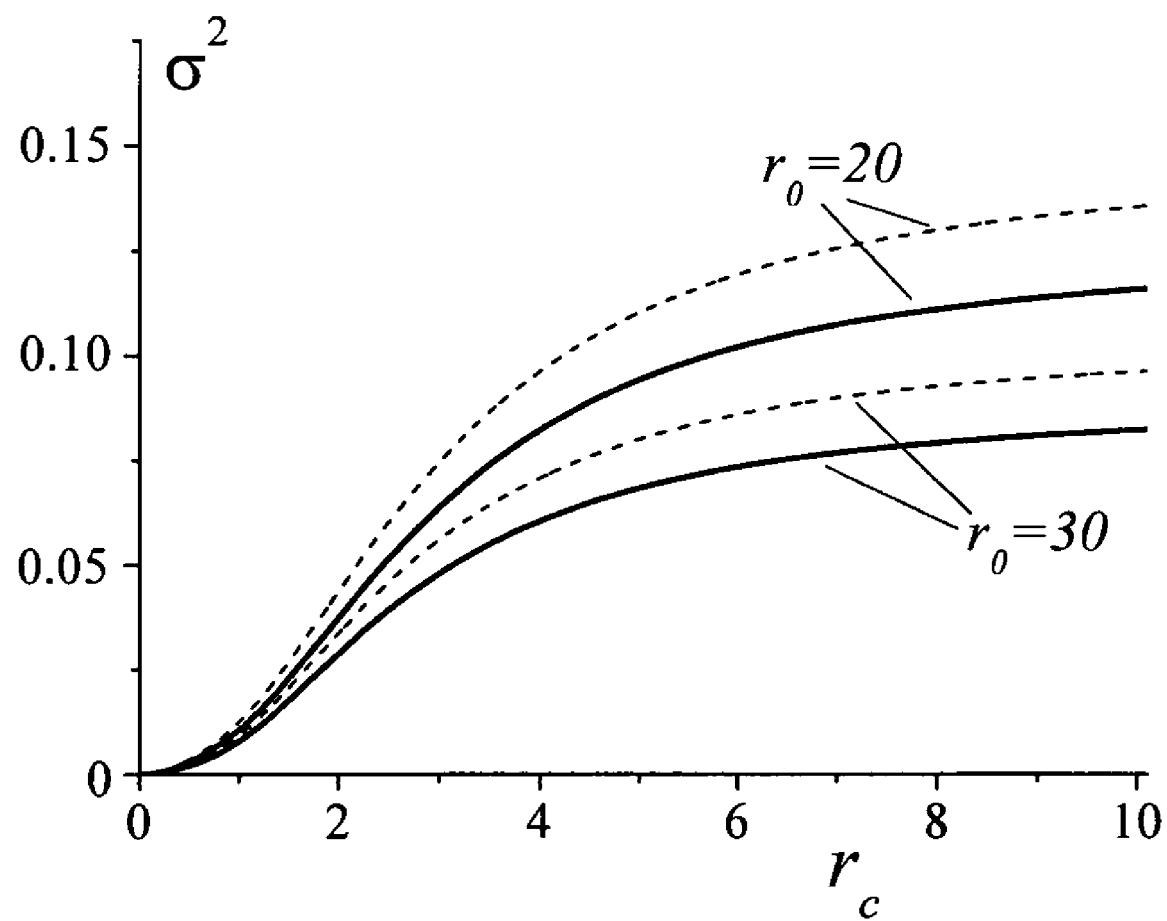
FIG. 1 shows a graphical representation of the dependence of the scintillation index on the initial coherence radius for the center of a laser beam. The following values of the parameters were used: L=3.7 km, $C_n^2=10^{-13} m^{-2/3}$ (the dashed lines), L=10 km, $C_n^2=1.4\times10^{-14} m^{-2/3}$ (the solid lines), $\lambda=1.55$ µm, $l_0=2\times10^{-2}$ m.

The invention is generally concerned with a method and system for gigabit rate free space optical communication (FSOC). An aspect of the invention is concerned with scintillation suppression based on time averaging of a partially coherent beam (TAPCB) for gigabit rate free space optical communication (FSOC).

In the invention, TAPCB is combined with spectral encoding. In the past, spectral encoding has been applied to fiber optics communication for code-division-multiple-access. In the present invention, information is encoded in the form of amplitude modulation of the spectral components of a laser pulse having a broad spectrum. For long-distance communication, a broad-spectrum light source could be, for example, a Ti: sapphire laser. For short-distance communication, it could be, for example, a Ti: sapphire laser or an light emitting diode (LED). Each pulse or sequence of pulses (depending on the averaging response time of the photosensor) may contain kilobits of data. If the pulse repetition rate is about 10 MHz, then the transmitted data rate is on the order of about several gigabits per second. Embodiments of the invention employ spatial light modulators (SLMs), which are based on multiple quantum well (MQW) technology with a frame rate of several MHz.

To reduce scintillations using Gaussian statistics, digital data is encoded in the spectrum of a wideband source in the form of amplitude modulation of the source spectrum.

In some embodiments of the present invention, a coding/decoding procedure uses a diffraction grating that provides spatial separation between the different spectral components of the optical pulse. In other embodiments, another type of dispersive element, such as a prism, may be used. The spectrum is modulated using a spatial light modulator.

Parallel detection of the spectral components is accomplished using a relatively slow photosensor such as a charge-coupled device (CCD) array. If the spatial light modulator (SLM) for coherent control has the frame rate of, for example, 10 MHz, then the frame rate of the CCD could be 1 MHz.

By encoding the information and providing Gaussian statistics for the laser beam (by controlling the initial partial coherence), the phenomenon of fluctuations averaging and significant suppression of the scintillations that occur during a long-distance propagation may be utilized.

In some embodiments, in order to achieve Gaussian statistics of a laser beam at the aperture of a photosensor, a laser beam with partial initial transverse coherence is used. It is known in the art that an initial partially coherent laser has a much smaller scintillation index than a fully coherent beam.

For long propagation distances, and for initially partially coherent laser beams, the scintillation index asymptotically approaches zero with decreasing ratios of the coherence radius to the beam radius. This phenomenon occurs in some region of the coherence radius. Also, it is known in the art that beam wandering and beam fragmentation are reduced for a partially coherent beam. In the case of short distance applications (the last mile problem), LEDs can be used as wideband sources. As a non-coherent source of spontaneous emission, an LED has the Gaussian statistics with almost delta-correlation transverse coherence. Thus, in embodiments employing an LED as a light source, the control of partial coherence is not needed.

Scintillations Reduction Due to Time Averaging of a Partially Coherent Beam. It is well established that for long distances the scintillation index of plane and spherical waves propagating through the atmospheric turbulence asymptotically tends to unity [9]. For an initially partially coherent beam, the asymptotic behavior depends on the relation between the correlation time of the source and the response time of the photodetector. If the average correlation time of two different coherent spots in the beam's cross section is shorter than the response time of the photodetector, then the scintillation index asymptotically tends to zero. If the correlation time of the coherent spots is longer than the response time of the photodetector, then the scintillation index asymptotically tends to unity. These properties of a partially coherent beam can be explained if the scintillations at the photodetector follow Gaussian statistics. If the coherence radius, $r_c$, of the initial beam is significantly smaller than the beam radius, $r_0$, the process of propagation of the laser beam can be considered as the independent propagation of a large number of coherent beams. Consequently, the intensity fluctuations of each coherent region caused by atmospheric turbulence are statistically independent. With an increasing propagation distance, the individual coherent spots overlap due to diffraction effects. According to the Central Limit Theorem, the intensity (which is the result of contributions of a large number of independent regions) has a normal statistical distribution. The suppression of scintillations in the signal measurements is due to the properties of the Gaussian statistics. The fluctuations in the signal generated by a photodetector with a slow response time are proportional to the following integral over light intensity absorbed during the response time:

$$\langle i(t)i(t)\rangle - \langle i^2(t)\rangle \sim \int_0^\infty dt_1 \int_0^\infty dt_2 \exp(-|t-t_1|/T - |t-t_2|/T)[\langle I(t_1)I(t_2)\rangle - \langle I(t)\rangle^2]. \quad (1)$$

In expression (1), i(t) is the photocurrent, I(t) is the light intensity, and T is the response time of the photodetector. According to the extended Huygens-Fresnel principle, the optical field at the receiver plane can be expressed in terms of the integral optical field at an intermediate plane according to expression (2):

$$E(\vec{r}, L, t) \sim \int\int_\Sigma d^2 s E(\vec{s}, z, t) \exp\left[\frac{ik|\vec{s}-\vec{r}|^2}{2(L-z)} + \Psi(\vec{s}, \vec{r}, t)\right], \quad (2)$$

where $\Psi(\vec{s}, \vec{r})$ is the complex phase of the wave propagating through the turbulent medium from the point (s,z) to the point (r,L). As follows from expression (2), the values of the averaging in expression (1) are of fourth order in the field moment:

$$\langle E(\vec{s}_1, z, t_1) E^*(\vec{s}_1, z, t_1) E(\vec{s}_3, z, t_2) E^*(\vec{s}_4, z, t_2)\rangle. \quad (3)$$

For Gaussian statistics, this fourth order moment can be expressed in terms of the second order moments:

$$\langle E(\vec{s}_1,z,t_1)E^*(\vec{s}_2,z,t_1)E(\vec{s}_3,z,t_2)E^*(\vec{s}_4,z,t_2)\rangle =$$

$$\langle E(\vec{s}_1,z,t_1)E^*(\vec{s}_2,z,t_1)\rangle\langle E(\vec{s}_3,z,t_2)E^*(\vec{s}_4,z,t_2)\rangle + \langle E(\vec{s}_1,z,t_1)E^*(\vec{s}_4,z,t_2)\rangle\langle E(\vec{s}_3,z,t_2)E^*(\vec{s}_2,z,t_1)\rangle. \quad (4)$$

The typical difference between the times, $t_1$ and $t_2$, in (1) can be estimated as $|t_1-t_2|\sim T$. If the response time of the photodetector, T, exceeds the average correlation time between two coherent spots $\tau_c$, $T \gg \tau_c$, the second term on the right-hand side of the expression (4) is equal to zero. As a result, from expression (1), we obtain $\langle I(t_1)I(t_2)\rangle=\langle I\rangle^2$. This shows that the scintillation index $\sigma^2=(\langle I^2\rangle-\langle I\rangle^2)/\langle I\rangle^2$ is equal to zero. By contrast, when the correlation time is much longer than the photodetector response time, $T \ll \tau_c$, the second term in the expression (4) is equal to the first term, and the scintillation index is equal to unity.

As the above considerations show, the time response of the photodetector must be much longer than the inverse frame rate of the spatial light modulator (SLM). Another requirement is that the number of individual coherent spots in the initial beam must be sufficiently large. In other words, the coherence radius, $r_c$, must be much smaller than the beam radius, $r_0$. It should be noted that the minimum size of the initial coherence radius, $r_c$, is limited by two physical effects. First, the angular spreading of the laser beam is defined by the diffraction angle, $\theta \sim \lambda/r_c$. Consequently, for a very small coherent radius, $r_c$, the beam spread will be unacceptably large. Second, for a very small initial coherence radius, the diffraction effect will dominate in the formation of the beam coherence in comparison with the influence of the atmospheric turbulence. In this case, according to the Van Cittert-Zernike theorem, the coherence radius will increase during the propagation. Thus, a very important requirement can be formulated: In order to significantly suppress the laser beam scintillations, one must work in the regime in which an optimal initial coherence radius, $r_c$, is chosen which satisfies the inequality, $r_{min} < r_c < r_{max}$. The optimal initial coherence radius, $r_c$, depends on the strength of the atmospheric turbulence and the propagation length, L.

In the invention, the adaptive control of the initial coherence is achieved using a feedback channel (a feedback loop). A radiofrequency (RF) or an optical channel, for example, could provide feedback from measurements of the scintillation index at the receiver to the SLM at the laser source.

Calculation of the Scintillation Index for the Case of Strong Turbulence. Our analysis is based on the equation for the fourth-order correlation function derived by Tatarskii in the Markov approximation [see: Tatarski, Wave Propagation in a Turbulent Medium, translated. By R. A. Silverman, McGraw-Hill, New York (1961); and Tatarskii, The Propagation of Short Waves in a Medium With Random Inhomogeneities in the Approximation of a Markov Random Process, Preprint, Academy of Sciences of the USSR, Moscow 1970.]. The equation for the correlation function $$\Gamma_4(\zeta;\vec{\rho}_1,\vec{\rho}'_1,\vec{\rho}_2,\vec{\rho}'_2)=\langle E(\zeta,\vec{\rho}_1)E^*(\zeta,\vec{\rho}'_1)E(\zeta,\vec{\rho}_2)E^*(\zeta,\vec{\rho}'_2)\rangle \quad (5)$$

has the form $$\frac{\partial \Gamma_4}{\partial \zeta} = \frac{i}{2q}(\Delta_1 + \Delta_2 - \Delta'_1 - \Delta'_2)\Gamma_4 - F(\zeta;\vec{p}_1,\vec{p}'_1,\vec{p}_2,\vec{p}'_2)\Gamma_4, \quad (6)$$

where $\zeta=x/L$, $\vec{\rho}_{1,2}=\vec{r}_{1,2}/\rho_0$, $\vec{\rho}'_{1,2}=\vec{r}'_{1,2}/\rho_0$ (x is the longitudinal coordinate), $\vec{r}_{1,2}, \vec{r}'_{1,2}$ are the transversal coordinates, L is the propagation length, $\rho_0$ is the normalizing transverse scale, which is chosen below, $$q = \frac{k\rho_0^2}{L},$$

where k is the wave number.

$$F(\zeta,\vec{r}_1,\vec{r}_2,\vec{\rho})=H(\zeta,\vec{r}_1+\vec{\rho}/2)+H(\zeta,\vec{r}_1-\vec{\rho}/2)+H(\zeta,\vec{r}_2+\vec{\rho}/2)+H(\zeta,\vec{r}_2-\vec{\rho}/2)-H(\zeta,\vec{r}_1+\vec{r}_2)-H(\zeta,\vec{r}_1-\vec{r}_2). \quad (7)$$

In the expression (7) we introduced the new variables $$\vec{r}_1 = \frac{1}{2}(\vec{\rho}_1 - \vec{\rho}_2 + \vec{\rho}'_1 - \vec{\rho}'_2); \quad (8)$$

$$\vec{r}_2 = \frac{1}{2}(\vec{\rho}_1 - \vec{\rho}_2 - \vec{\rho}'_1 + \vec{\rho}'_2), \quad \vec{\rho} = \vec{\rho}_1 + \vec{\rho}_2 - \vec{\rho}'_1 - \vec{\rho}'_2;$$

$$R = \frac{1}{4}(\vec{\rho}_1 + \vec{\rho}_2 + \vec{\rho}'_1 + \vec{\rho}'_2).$$

In these new variables, Equation (6) takes the form $$\frac{\partial \Gamma_4}{\partial \zeta} = \frac{i}{q}(\nabla_R \nabla_\rho + \nabla_{r_1} \nabla_{r_2})\Gamma_4 - F(\zeta,\vec{r}_1,\vec{r}_2,\vec{\rho})\Gamma_{S_4}, \quad (9)$$

where $$h(\zeta,\vec{\rho}) = 8 \int\int \Phi_n(\zeta,\vec{\kappa})[1 - \cos\vec{\kappa}(\vec{\rho}_1 - \vec{\rho}_2)]d^2\vec{\kappa}, \quad (10)$$

and $\Phi_n(\zeta,\vec{\kappa})$ is the spectral density of the structure function of the refractive index, which is given by $$\langle \delta n(\zeta,\vec{\rho})\delta n(\zeta,\vec{\rho}')\rangle = 2\pi\delta(\zeta-\zeta')\int\int \Phi_n(\zeta,\vec{\kappa})\exp(-\vec{\kappa}(\vec{\rho}-\vec{\rho}'))d^2\kappa. \quad (11)$$

Following Tatarskii, we chose the spectral density of the structure function of the refractive index in the form $$\Phi_n(\zeta,\vec{\kappa}) = 0.033 C_n^2 \kappa^{-11/3} \exp\left(-\frac{\kappa^2}{\kappa_m^2}\right). \quad (12)$$

In this case the analytical approximations for the function $H(\zeta,\vec{\rho})$ have the form $$H(\zeta, \vec{\rho}) = \begin{cases} 1.64 C_n^2 k^2 \rho_0^2 \rho^2 l_0^{-1/3}, & \text{for } \rho \ll \dfrac{l_0}{\rho_0}, \\ 1.24 C_n^2 k^2 \rho_0^{5/3} \rho^{5/3}, & \text{for } \rho \gg \dfrac{l_0}{\rho_0}, \end{cases} \quad (13)$$

where $l_0=5.92\,\kappa_m$. The transverse scale, $\rho_0$, is the scale of variation of the phase structure function of the plane waves corresponding to the path L. It is defined by the following equation [14]:

$$1.64 C_n^2 k^2 L \rho_0^2 l_0^{-1/3} = 1.$$

If the light source emits a partially coherent light with Gaussian statistics at the source plane, $\zeta=0$, the fourth-order correlation function can be expressed in terms of the second order correlation functions $$\Gamma_{4,0}(\vec{\rho}_1, \vec{\rho}'_1, \vec{\rho}_2, \vec{\rho}'_2) = \langle E(\zeta=0, \vec{\rho}_1) E^*(\zeta=0, \vec{\rho}'_1) \rangle$$
$$\times \langle E(\zeta=0, \vec{\rho}_2) E^*(\zeta=0, \vec{\rho}'_2) \rangle + \langle E(\zeta=0, \vec{\rho}_1) E^*(\zeta=0, \vec{\rho}'_2) \rangle \langle E(\zeta=0, \vec{\rho}_2) E^*(\zeta=0, \vec{\rho}'_1) \rangle, \quad (14)$$

where the normalized second order correlation function is given by the expression $$\Gamma_{2,0}(\vec{\rho}_{1,2}, \vec{\rho}'_{1,2}) = \langle E(\zeta=0, \vec{\rho}_{1,2}) E^*(\zeta=0, \vec{\rho}'_{1,2}) \rangle = \exp\left(-\dfrac{\vec{\rho}_{1,2}^2 + \vec{\rho}'^2_{1,2}}{2 r_0^2}\right) \exp\left(-\dfrac{(\vec{\rho}_{1,2} - \vec{\rho}'_{1,2})^2}{r_c^2}\right). \quad (15)$$

In Equation (15), $r_0$ is the beam radius and $r_c$ is the coherence radius. For the case of small coherence radii in comparison with the beam radius: $r_c \ll r_0$, a conventional approach to the problem of laser beam propagation is based on an assumption of small deviations of the beam parameters from those that correspond to free-space propagation. This approach is limited to the conditions of weak turbulence or short propagation lengths.

Another approach is based on the fact that for any relatively long distance, the coherence radius is smaller than the beam radius (see: Yakushkin, "Strong Intensity Fluctuations in the Field of a Light Beam in a Turbulent Atmosphere," Radiophys. Quantum Electron., vol. 19, pp. 270–276 (1976)). Starting with the exact solution of Equation (9) for a beam with $r_c=0$, Yakushkin developed a perturbation theory in which the small parameter $r_c/r_0 \ll 1$, is the ratio of the coherence radius $r_c$ to the beam radius $r_0$. In the case of an initially fully coherent beam was considered. Thus, his theory was actually an asymptotic theory, applicable to relatively long distances. By contrast, the present invention initially employs a partially coherent beam and therefore is applicable to any distance.

The solution of Equation (9) can be written in the integral form $$\Gamma_4(\vec{P}, \zeta) = \int \Gamma_{4,0}(\vec{P}') G(\vec{P}, \vec{P}', \zeta) d\vec{P}', \quad (16)$$

where $\vec{P}$ is the set $\vec{r}_1, \vec{r}_2, \vec{\rho}, \vec{R}$, and $G(\vec{P}, \vec{P}', \zeta)$ is the Green's function. We assume that the main contribution to the integral is due to areas of coherence, in which the difference between two vectors has the value $|\vec{\rho}_{1,2} - \vec{\rho}'_{1,2}| \sim \rho_c$, where $\rho_c$ is the coherence radius for the propagation length $\zeta$. Note that initially ($\zeta=0$), the coherence radius is defined by the source $\rho_c = r_c$. For these areas, the values of the vectors $\vec{r}_2$ and $\vec{\rho}$ are of order $\rho_c$. In this case, the values of the vector $\vec{r}_1$ are of the order of the beam radius $\rho_0$, which at the source plane is equal to the initial beam radius $r_0$. We assume that the coherence radius is much smaller than the beam radius. Hence we have $r_2, \rho \ll r_1$. Since the function $\Gamma_4$ is symmetric with respect to $r_1$ and $r_2$, there are other areas where $r_2 \gg r_1$, $\rho$. Taking into account these inequalities, we can obtain the zeroth order approximation for the function $F(\zeta, \vec{r}_1, \vec{r}_2, \vec{\rho})$:

$$F^0(\zeta, \vec{r}_1, \vec{r}_2, \vec{\rho}) = H(\zeta, \vec{r}_2 + \vec{\rho}/2) + H(\zeta, \vec{r}_2 - \vec{\rho}/2). \quad (17)$$

In this approximation the Green's function has the form $$G^0(\vec{P}, \vec{P}', \zeta) = \dfrac{q^4}{16\pi^4 \zeta^2} \exp\left\{\dfrac{iq}{\zeta}\left[(\vec{R} - \vec{R}')(\vec{\rho} - \vec{\rho}') + (\vec{r}_1 - \vec{r}'_1)(\vec{r}_1 - \vec{r}'_1)\right]\right\} \times \exp\left\{-\zeta(\vec{r}_2 - \vec{r}'_2 + (\vec{\rho} - \vec{\rho}')/2)^2 - \zeta(\vec{r}_2 - \vec{r}'_2 - (\vec{\rho} - \vec{\rho}')/2)^2\right\}. \quad (18)$$

In Equation (18), we use the quadratic approximation for the function $H(\zeta, \vec{\rho})$ (the upper line of expression (13)). Writing the Green's function in the form $G = G^0 + \Delta G$, and using the Green's function formula, we obtain the following integral equation:

$$G(\vec{P}, \vec{P}', \zeta) = G^0(\vec{P}, \vec{P}', \zeta) - \int_0^\zeta d\zeta' \int \Delta F G^0(\vec{P}'', \vec{P}', \zeta') G(\vec{P}, \vec{P}'', \zeta - \zeta') d\vec{P}'' d\zeta', \quad (19)$$

where $\Delta F = F - F^0$. Using (16) and (19), we obtain the integral equation for $\Gamma_4$, (which is equivalent to the differential equation (9)):

$$\Gamma_4(\vec{P}, \zeta) = \int \Gamma_{4,0}(\vec{P}') G^0(\vec{P}', \vec{P}, \zeta) d\vec{P}' - \int_0^\zeta d\zeta' \Delta F G^0(\vec{P}, \vec{P}', \zeta') \Gamma_4(\vec{P}', \zeta - \zeta') d\vec{P}'. \quad (20)$$

We use Equation (20) in our perturbation theory. The zeroth approximation for $\Gamma_4$ is given by the first term on the right hand side of Equation (20). The first-order approximation term is obtained by substituting the zeroth approximation term in the second term on the right hand side of equation (20). Note that to calculate the term $\Delta F$ we have to use the approximation presented by the lower line in Equation (13) because the beam radius $\rho_0$ is assumed to be much larger than the smallest turbulence scale $l_0$, $\rho_0 \gg l_0$. After performing calculations, we obtain the following expression for the scintillation index (at the center of the beam)

$$\sigma^2 = 0.68\alpha_0(\xi=1)Q^{1/16}q^{1/16}\int_0^1 d\xi \frac{\left[\frac{0.286}{\beta(\xi)} - \frac{0.43}{\gamma(\xi)} + \frac{0.157\mu^2(\xi)}{\gamma^2(\xi)\alpha_2(\xi)}\right]}{(1-\xi^2)\alpha_0(\xi)\gamma(\xi)\beta(\xi)\alpha_2^{5/6}(\xi)}, \quad (21)$$

where $$Q = \frac{kl_0^2}{L}; \ \alpha_0 = \xi + \frac{1}{r_f^2} + \frac{q^2 r_0^2}{4\xi^2}; \ \frac{1}{r_f^2} = \frac{1}{r_c^2} + \frac{1}{4r_0^2}; \ \mu = \frac{1}{1-\xi} + \frac{1}{2\xi\alpha_0 r_f^2};$$

$$v = \frac{2}{\alpha_0 r_f^2}\left(\xi + \frac{q^2 r_0^2}{4\xi^2}\right);$$

$$\beta = v + 1 - \xi + \frac{\alpha_0 \xi^2 \mu^2}{2};$$

$$\gamma = v + 2(1-\xi);$$

$$\alpha_2 = \frac{\mu^2}{4\gamma} + \frac{1}{8\xi^2 \alpha_0}.$$

The scintillation index decreases as the initial coherence radius, $r_c$, decreases, as can be seen in FIG. 1. For coherence radii less than 4, the scintillation index has a quadratic-like dependence. For a certain value of the coherence radius, a larger beam radius corresponds to a smaller scintillation index. Actually, the scintillation index decreases linearly with an inverse number of coherent spots $\sigma^2 \sim N_c^{-1} = r_c^2/r_0^2$. Thus the scintillation index decreases by an order of magnitude as the coherence radius $r_c$ decreases from 3 to 1 (see FIG. 1).

Figure 2:
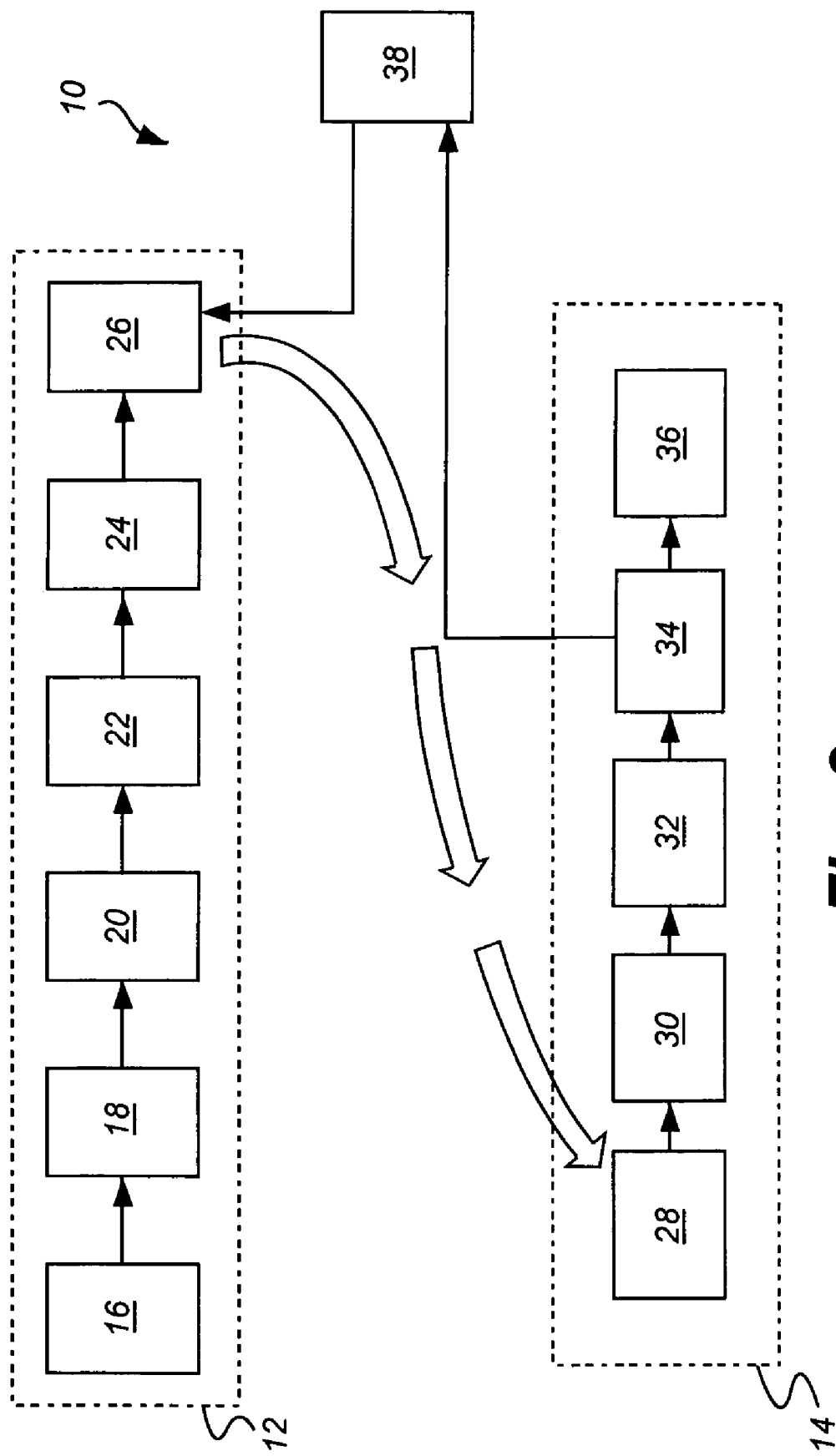
FIG. 2 shows a schematic representation of an embodiment system for wideband laser communication with wavelength encoding.

An Embodiment System and Method Based on Spectral Amplitude Encoding of a Broadband Pulsed Laser. According to the present invention, digital data are encoded in a spectrum of a wide-band light source, such as Ti: sapphire laser, that operates at a high repetition rate. Usually Ti: sapphire lasers can operate at a repetition rate in a broad range from a few Hz up to GHz. If each series of N laser pulses (the number of pulses depends on the averaging time of the photosensor) contains kilobits of data and the series repetition rate is several MHz, then the data rate is a few gigabytes per second (Gbps). Usually, information is encoded as an amplitude modulation in time of a continuous wave laser beam. In this case, intensity fluctuations make significant contributions to the bit error rate (BER). The spectral domain encoding method of this invention is less sensitive to intensity and phase fluctuations because the information is decoded in a massively parallel way using a relatively slow photosensor, which minimizes the scintillations by time averaging. Spectral-domain encoding is achieved using, for example, a wideband Ti: sapphire laser with an electro-optical spatial light modulator (SLM), as demonstrated using embodiment apparatus 10 shown in FIG. 2. Apparatus 10 includes transmitter portion 12 and receiver portion 14. Transmitter portion 12 includes light source 16 (a pulsed Ti: sapphire laser, for example), which produces a pulsed light beam. The spectrum of each laser pulse is dispersed spatially by dispersive element 18 (a spectral grating or prism, for example), and the spatially dispersed light is imaged using imaging element 20 (a lens, for example) onto wavelength encoder 22 (which is a type of spatial light modulator (SLM)), which encodes the light pulses. Wavelength encoder 22 includes pixels that can be turned on and off. The light traversing wavelength encoder 22 will have certain spectral bins turned on or off, depending on whether the corresponding pixels of wavelength encoder 22 are on or off. In an embodiment, wavelength encoder 22 also forms the spatial coherence of the initial pulsed light beam. The angular dispersed, wavelength encoded spectral components are then recombined into single optical beam using spectral dispersive element 24 (a spectral grating, or prism, for example), and thereafter sent through a coherence controller 26 (which is another type of spatial light modulator). Coherence controller 26 modifies the transverse coherence of the pulsed light beam. The receiver portion 14 of apparatus 10 includes an optical element referred to herein as collector 28 (a telescope or parabolic mirror, for example) that receives the pulsed light beam from coherence controller 26 after it has traversed a certain distance "L". In many embodiments, L will be equal to or greater than about 10 kilometers. Collector 28 receives the pulsed light beam and redirects it to dispersive element 30 (a grating or prism, for example), which disperses the wavelength-modulated signal, and the dispersed components of the signal are imaged using imaging element 32 onto detector 34 (a high-speed charge-coupled device (CCD) or photodiode array, for example). A high-speed data processing unit 36 is then used to process (decode, etc.) the electronic signal from detector 34. The optimal value of the radius of coherence, $r_c$, is maintained by using a feedback element 38 between coherence controller 26 and processing unit 36. Feedback element 38 could be a part of transmitter portion 12, part of receiver portion 14, or separate from both transmitter portion 12 and receiver portion 14.

In a preferred embodiment, dispersive element 18 spreads the spectrum of the light beam pulse along a single coordinate and therefore, wavelength encoder 22 is preferably a single array wavelength encoder and photodetector 34 is a single array CCD used for sensing.

Values of parameters needed to achieve a gigabit per second (Gbps) rate can be estimated as follows. When a grating is used as a dispersive element, the grating dispersion is described by the grating equation $$\sin\theta_{inc} - \sin\theta_{diff} = m\frac{\lambda}{d}, \quad (22)$$

where $\theta_{inc}$ is the incident angle, $\theta_{diff}$ is the diffraction angle, m is the diffraction order, and d is the grating period. Usually, the incident angle is fixed $\theta_{inc}$=const. Then the angle variation $\delta\theta_{diff}$ as a function of the wavelength variation $\delta\lambda$ is $$\delta\theta_{diff} = m\frac{\delta\lambda}{d\cos\theta_{diff}}. \quad (23)$$

The spatial image at the SLM plane of the spectral interval, corresponding to the distance between two neighboring bits, must exceed the size of an individual pixel of the SLM, $1_{pxl}$. Then $\delta\theta_{diff} F \geq 1_{pxl}$, where F is the focal distance of imaging element (when imaging element 20 and/or imaging element 32 is an imaging lens). From the expression (23) we obtain the following estimate of the spectral interval $$\delta\lambda = \frac{1_{pxl} d}{Fm}. \quad (24)$$

Using (24), we estimate the information capacity, M, of the laser pulse that has the spectral width $\Delta\lambda$, $$M = \frac{\Delta\lambda}{\delta\lambda} = \frac{\Delta\lambda Fm}{l_{pxl}d\cos\theta_{diff}}. \qquad (25)$$

For the values of parameters Δλ=40 nm (for the wavelength λ=1.55 μm this spectral width corresponds to a pulse duration 200 femtoseconds (fs), F=10 cm, m=2, $l_{pxl}$=10 μm, $d^{-1}$=1.5× $10^3$ $mm^{-1}$, cos $\theta_{diff}$=0.6, we obtain N=2×$10^3$. Using a CCD array with a frame rate of 1 MHz, a single array MQW encoding SLM with the frame rate of 1 MHz, 10×10 pixels multiple quantum well (MQW) SLM for the coherence control (i.e. coherence controller 24) with a frame rate of 10 MHz, and Ti: sapphire laser with a pulse duration of 200 fs, and the repetition rate 10 MHz, we achieve the data rate of 2 gigabits per second.

An embodiment method for high-speed free space optical communication that involves using LEDs as a light source. Another aspect of the present invention addresses a problem of low-cost, high-speed wireless connections. This is a problem faced by individual customers with backbone optical fiber channels, and has sometimes been known in the art as the "last mile bottleneck" problem. The increasing demand for wireless connections to optical fiber channels stimulated needs of FSOC technology for short distances of from about 0.25 mile to about one mile. Short-distance FSOC can be used also for disaster recovery following natural catastrophes and terrorist attacks. Until recently, FSOC used lasers as light sources. The LED as a source was considered as undesirable for three reasons: (i) limited modulation frequency (typically up to 100 Mbps), (ii) high radiation divergence, and (iii) low power. However, when compared with lasers for short-distance FSOC, LEDs have the advantages of higher reliability, reduced temperature sensitivity, immunity to optical feedback, and lower cost. In some embodiments of the present invention, light emitting diodes (LEDs) are used as light sources for free space optical communication (FSOC) over a short distance of about one mile or less. These embodiments are concerned with a method for gigabyte data rate optical communication over a distance of less than about one mile using a light emitting diode source. This method involves spectrally dispersing wide band pulses of light from a light emitting diode light source, then encoding the spectrally dispersed wide band pulses of light, then recombining the spectrally dispersed, encoded wide band pulses of light into a single optical beam, and thereafter allowing the wide band pulses of light to travel a distance "L" wherein L≦1 mile, and thereafter receiving the wide band pulses of light after they have traveling the distance "L". LEDs are a source of spontaneous non-coherent emission, and therefore their emission has Gaussian statistics with a very short coherence time, of the order $10^{-13}$ s or less. Contrary to the conventional time domain encoding technology, the spectral encoding technology does not require high modulation rates: A modulation rate of about several MHz provides a channel with a Gbps data rate.

In summary, the invention is concerned with a free space, gigabit speed optical communication method and system based on spectral encoding of radiation from a broadband, pulsed laser. In combination with control of the partial coherence of the laser beam and the relatively slow photosensor, we have shown that scintillations can be suppressed by orders of magnitude for communication distances beyond 10 kilometers (km). The invention is also concerned with gigabit rate, optical communication over short distances of less than about a mile using spectral encoding of light emitted from an LED light source, which could be part of a rapid deployment system for disaster recovery.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for free space, high-speed optical communication, comprising:
    a transmitter portion comprising a wide band, pulsed light source that emits light beam pulses, a first spectral element for spatially dispersing the light beam pulses, a first electro-optical spatial light modulator for encoding the spectral domain of the light beam pulses from the pulsed beam of light, a second spectral element for recombining the dispersed, encoded light into single optical beam pulses, and a second electro-optical spatial light modulator for modifying the transverse coherence of the collected and encoded light beam pulses,
    a receiver portion comprising a third spectral element for dispersing the encoded and modified pulsed light beam pulses, and a photosensor array for detecting the dispersed, encoded, modified light beam pulses, and a data processing element for decoding and processing data received from the photodetector at a rate 'R' wherein R≧1 Gibabits per second (Gbps), and
    a feedback element in communication with said second spatial light modulator and said photodetector for maintaining an optimal value of a coherence radius, $r_c$, of the light beam pulses.

2. The system of claim 1, wherein said transmitter of said system further comprises an imaging element for imaging the spatially dispersed light beam pulses from said first spectral element onto said first electro-optical spatial light modulator.

3. The system of claim 1, wherein said receiver of said system further comprising an imaging element for imaging the dispersed, encoded, modified light beam pulses from said third spectral element onto said photosensor array.

4. The system of claim 1, wherein the wide band, pulsed light source comprises a laser having a broadband emission.

5. The system of claim 1, wherein the wide band, pulsed light source comprises a Ti: sapphire laser.

6. The apparatus of claim 1, wherein at least one of said first spectral element or said second spectral element or said third spectral element comprises a grating, a prism, or combinations thereof.

7. The apparatus of claim 1, wherein said transmitter portion further comprises a collimating element for collimating encoded light beam pulses from the second spectral element to the second electro-optical spatial light modulator.

* * * * *